United States Patent [19]

Epstein

[11] 3,818,449

[45] June 18, 1974

[54] COMMUNICATIONS PROCESSOR SYSTEM HAVING TIME SHARED CONTROL DEVICES AND DIALERS

[75] Inventor: Barry M. Epstein, Dallas, Tex.

[73] Assignee: Action Communication Systems Inc., Dallas, Tex.

[22] Filed: Mar. 28, 1973

[21] Appl. No.: 345,704

[52] U.S. Cl. ........................ 340/147 CN, 179/18 ES

[51] Int. Cl. ............................................. H04q 3/00

[58] Field of Search ...... 340/147 R, 147 CN, 147 P, 340/150; 179/15 A, 15 BV, 18 ES

[56] References Cited

UNITED STATES PATENTS

| | | | |
|---|---|---|---|
| 3,181,121 | 4/1965 | Losch et al. | 340/147 R |
| 3,599,160 | 8/1971 | Nestle | 179/15 BV |
| 3,699,525 | 10/1972 | Klavins | 179/18 ES |

*Primary Examiner*—Donald J. Yusko
*Attorney, Agent, or Firm*—Richards, Harris & Medlock

[57] ABSTRACT

A communications processor system wherein a message-switching digital computer controls the transmission of digital data between terminals connected along at least one communications line. One embodiment of the invention includes a plurality of communication control devices connected to the computer for transmitting digital messages output from the computer, each of the control devices having different operational characteristics. A switch is operable to selectively connect the output of any one of the control devices to a single communications line, such that the benefit of the operational characteristics of any of the communications control devices may be selectively obtained. A single dialer is used to provide dialing signals for all of the control devices. In another embodiment of the invention, a plurality of communication control devices are connected through modems and interfacing devices to a plurality of communications lines. A single dialer may be selectively switched through any of the interfacing devices, such that the dialer is time shared between the various communications control devices.

9 Claims, 2 Drawing Figures

COMMUNICATIONS PROCESSOR SYSTEM HAVING TIME SHARED CONTROL DEVICES AND DIALERS

FIELD OF THE INVENTION

This application relates to communications control, and more particularly relates to a communications processor system wherein communication control devices and dialers may be selectively interconnected with communications lines.

THE PRIOR ART

Specialized communications processors have been heretofore developed in order to provide specialized control of the transmission and reception of digital messages and data over communications lines, such as teletype traffic over telephone lines. An example of such a specialized communications processor is the Telecontroller System manufactured and sold by the present assignee, Action Communications Systems, Inc. of Dallas, Texas.

Briefly, such communications processor systems generally comprise a properly programmed digital computer connected by a high speed data buss to a plurality of circuit control devices or ports. Each of the control devices includes a modulating circuit, commonly termed a modem, connected through an interfacing circuit to a single communications line such as a telephone or teletype line. A dialer is associated with the control device to enable communications to and from a particular terminal connected to the communications line. A number of different circuit control devices are presently available, each of which has different operational characteristics such as data transmission speed and formating of the digital data handled. For example, copending patent application Ser. No. 288,734, filed Sept. 13, 1972, entitled "Binary Synchronous Communications Processor System and Method" and assigned to the present assignee, discloses a circuit control device which operates upon binary synchronous data. A description of the construction and operation of a five-level asynchronous circuit control device is provided in the manual entitled "Operation and Maintenance Instructions for the Telecontroller," published April, 1971, by Action Communications Systems, Inc. of Dallas, Texas.

In prior systems, generally a particular communications control device having specified operating characteristics has been interconnected with a specific communications line. It has not then been heretofore possible to easily interchange a particular communications control device with another device having different operating characteristics. Moreover, separate dialing devices have generally been required for each communications control device. A need has thus arisen for a technique by which any one of a number of different control devices may be connected to a communications line and also by which a dialing device may be time shared among a plurality of communications control devices.

SUMMARY OF THE INVENTION

In accordance with the present invention, a communications processor system is provided which overcomes the foregoing and other disadvantages which have characterized prior communications systems. The present invention enables a single dialer and communications line to be selectively connected to any one of a number of different communications control devices.

In accordance with the present invention, a communications processor system includes a digital computer programmed to control the distribution of digital messages. A plurality of communications control systems are connected to the computer for transmitting digital messages from the computer. A dialer is operable by the computer for generating dial signals for a communications line. An interfacing circuit is connected to the communications line. A switch is operable by the computer for selectively connecting any one of the communications control systems and the dialer to the interfacing means.

In accordance with a more specific aspect of the invention, the communications processor system includes a digital computer programmed to control the distribution of digital messages. A plurality of communications control systems are connected to the computer for transmitting digital messages output from the computer, each of the control systems having different operational characteristics. A switch is operable in response to the computer for selectively connecting the output of any one of the control systems to a communications line.

In accordance with another aspect of the invention, a communications processor system includes a digital computer for controlling the transmission of digitally coded data to terminals connected to communications lines. The system includes a plurality of communications control ports connected to the output of the computer for receiving parallel digital data and for generating serial output data. Modems are connected to the output of the control ports for converting the serial output data into tone signals. Interfacing circuits direct the tone signals to the communications lines. A dialer generates a sequence of dialing pulses under the control of the computer. Switches are responsive to the computer for selectively switching the output of the dialer to different ones of the interfacing circuits.

DESCRIPTION OF THE DRAWINGS

For a more complete understanding of the present invention and for further objects and advantages thereof, reference is now made to the following description taken in conjunction with the accompanying drawings in which.

DESCRIPTION OF THE PREFERRED EMBODIMENT

Figure 1:
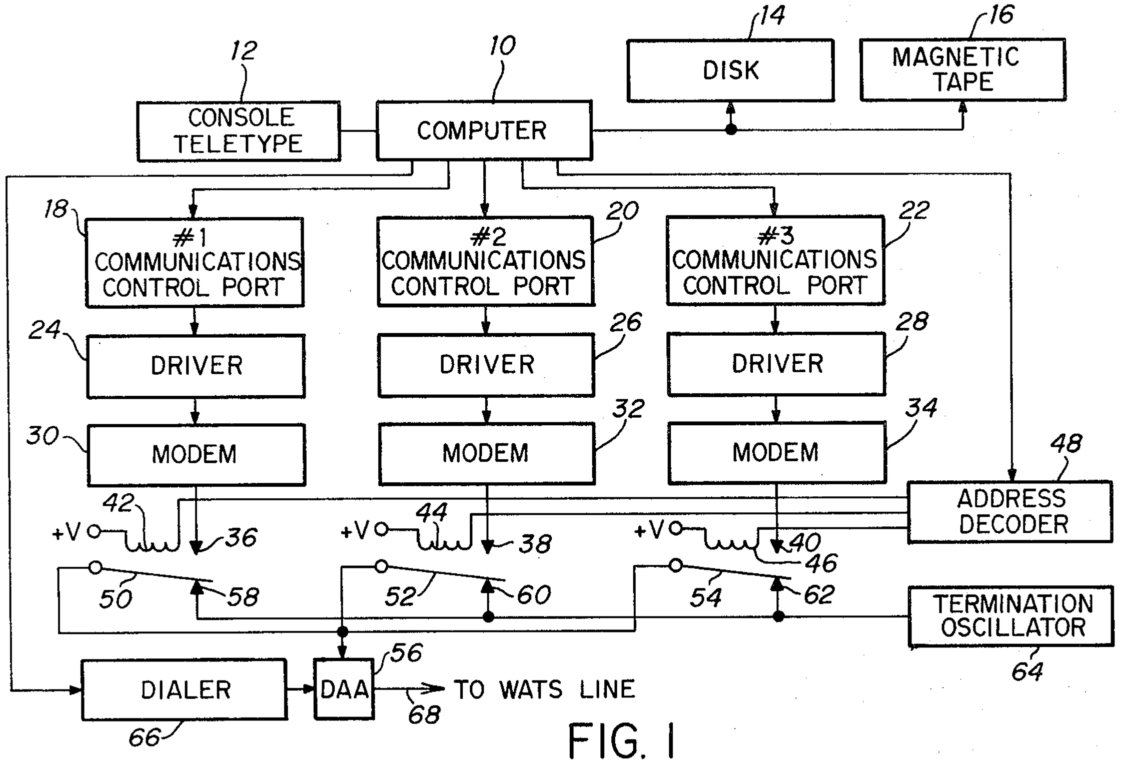
FIG. 1 is a block diagram of a communications processor system whrein any of three different communications control ports may be selectively interconnected to a single communications line and dialer system.

FIG. 1 illustrates a block diagram of a typical communications processor system according to the invention. The system includes a computer 10 which may comprise any suitably programmed general purpose digital computer. An example of a suitable computer for use with the invention is the Nova Computer manufactured and sold by Data General Corporation of South Borough, Massachusetts. For a detailed description of the construction and operation of the Nova Computer, reference is made to the publication entitled "How to Use the Nova and the Supernova," published May, 1970, by Data General Corporation.

A console teletype 12 is utilized as an input/output terminal for the computer 10. Program changes for the computer 10 may be input at the teletype 12 and diagnostic tests may be performed on the computer program through the teletype 12. In addition, the teletype 12 may be used to print out statistical information regarding the operation of the system. Storage for the computer 10 is provided by a disk 14 and magnetic tape 16.

The computer 10 has a high speed data buss in order to input and output parallel data at high speeds in the microsecond range. This high speed data is output through three communications control ports or devices 18, 20 and 22. Although only three communications control devices are illustrated in FIG. 1, it will be understood that any desired number of communications control devices may be utilized. Each of the communications control ports 18–22 converts the parallel digital data output by the computer 10 into serial digital data, properly formats the data as desired and transmits the serial digital data through drivers 24, 26 and 28 respectively to modems 30, 32 and 34 respectively.

An important aspect of the invention is that each of the communications control devices or ports 18–22 have different operating characteristics. For example, each of the control devices 18–22 may operate at different speeds. Alternatively, one of the control devices may comprise the binary synchronous control port described and claimed in copending patent application Ser. No. 288,734, previously noted. The remaining communications control devices may comprise a five-level asynchronous control device or a universal synchronous control device, each of which is disclosed in the manual entitled "Operation and Maintenance Instructions for the Telecontroller," published April, 1970, by Action Communication Systems, Inc. of Dallas, Texas. The disclosures of the above-captioned manual and copending patent application are incorporated herein.

The modems 30, 32 and 34 may comprise any one of a number of well known modem circuits such as the 201A Data Set manufactured by the American Telephone and Telegraph Company. For a more detailed description of the 201A Data Set, reference is made to the technical reference entitled "Data Sets 201A and 201B," published August, 1969, by the American Telephone and Telegraph Company. Briefly, the Data Set 201A transmits serial binary data over conventional voice band telephone lines using phase-shift keying (PSK) modulation. A transmitter in the Data Set 201A converts serial binary data to bit pairs called dibits which modulate the carrier. Each dibit is encoded to one of four possible carrier phase shifts. The telephone line signal applied from the modem thus comprises a serial train of phase-shifted signaling elements at one-half the bit rate. After filtering and shaping, the telephone signal spectrum occupies a bandwidth equal to the bit rate, centered about the carrier frequency.

The output of the modems 30–34 are respectively applied to relay contacts 36, 38 and 40. Relay coils 42, 44 and 46 are connected with an address decoder 48 which is controlled by the computer 10. A source of positive voltage is connected to a terminal of each of relay coils 42–46. Relay switches 50, 52 and 54 are associated with the relay coils 42–46 and are tied to a data access arrangement (DAA) 56. Relay contacts 58, 60 and 62 are connected to a termination oscillator 64 which generates a signal to take the place of the carrier signal generated from the modems when no modem is interconnected with DAA 56. A dialer system 66 is attached through the DAA 56 to a single communications line such as leased telephone line 68.

The dialer 66 may comprise any suitable dialing system such as the Data Auxiliary set 801A manufactured by the American Telephone and Telegraph Company. For a more detailed description of such a dialing system, reference is made to the Bell System Data Communications Technical Reference entitled "Data Auxiliary Set 801A (Automatic Calling Unit) Interface Specification," published March, 1964, by the American Telephone and Telegraph Company. The DAA comprises a conventional data interfacing system for attachment to a telephone line in the well known manner.

In operation of the system shown in FIG. 1, the computer 10 generates binary coded addresses and transmits the addresses to the address decoder 48 which converts the addresses into decimal outputs. The address decoder 48 may comprise for example the SN744 Decoder manufactured and sold by Texas Instruments and by Motorola Corporation. The selected output of the address decoder 48 drops to a low logic level to enable current flow through the selected one of the relay coils 42, 44 or 46. Energization of the coil causes the selected relay switch to close against one of the relay contacts 36, 38 or 40. The output from the selected modem is then applied to the relay switch to the DAA 56 for application to the Wats line 68.

The selected terminal on the Wats line 68 has previously been dialed by operation of the dialer 66 by computer 10. In operation, the computer 10 may be programmed to detect the most desirable communications control port or device for the particular type of data to be received or to be transmitted. The computer 10 then generates an address to the address decoder to select the desired communications control port. With the use of the present device, the system is provided with a substantial amount of flexibility in that various types and speeds of data may be transmitted over a single communications line, with only a single dialing system required. While the use of the system has been illustrated with only a single communications line, it will be understood that the system could be utilized to selectively switch a plurality of communications control devices between a plurality of communications lines, as desired.

Figure 2:
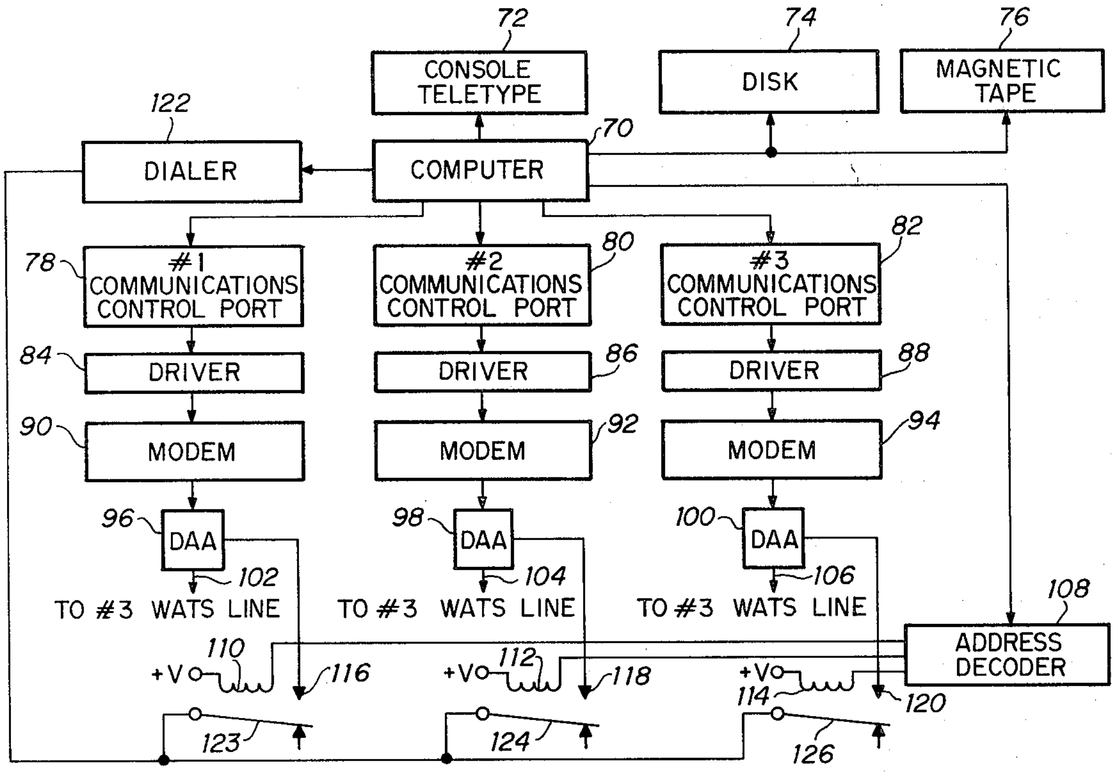
FIG. 2 illustrates a block diagram of another embodiment of a communications processor system wherein a dialing system may be selectively connected to any one of three communications control ports and associated communications lines.

FIG. 2 illustrates a system wherein a single dialing system may be selectively time shared between a plurality of communications control ports and associated communications lines. The system includes a computer 70, a control teletype 72 and a disk 74 and magnetic tape 76 which are identical to the system disclosed in FIG. 1. Similarly, three communications control ports 78, 80 and 82 are connected to transmit and receive digital data from the computer 70 in the manner previously described. The outputs of the ports 78–82 are respectively connected to drivers 84, 86 and 88, which then drive modems 90, 92 and 94 in the manner previously described.

In this system, the output of each modem 90–94 is interconnected to a separate data access arrangement (DAA) 96, 98 and 100. Each of the DAAs 96–100 are connected to a different communications line such as leased telephone lines 102, 104 and 106.

The computer 70 controls an address decoder 108 in the manner previously described in order to energize any one of three relay coils 110, 112 and 114. The DAAs 96–100 are connected to relay contacts 116, 118 and 120, respectively. The computer 70 controls a dialer 122, the output of which is applied to relay switch members 123, 124 and 126. The switch members 123–126 are normally open.

In the operation of the system shown in FIG. 2, the computer 70 generates binary addresses to the address decoder 108, which then selectively energizes one of the relay coils 110, 112 or 114 in order to interconnect the selected DAA 96, 98 or 100 with the output of the dialer 122. This system is primarily useful in operations when data transmission is relatively long compared to the time required for operation of the dialer 122. Thus, data may be transmitted via two of the DAAs 96 and 98, while relay 114 is energized such that dialing information is being transmitted through the DAA 100 to dial a selected terminal on the leased line 106. After the dialing operation is complete, the relay 114 may be opened and the relay coil 112 energized in order that dialing information may be applied from the dialer 122 through the DAA 98 to the leased line 104. In this manner, the dialer 122 may be time shared among the plural communications lines.

It will be understood that the systems of FIGS. 1 and 2 may be combined, such that a single dialer is shared among a plurality of communications control ports, with each of the communications control ports switchable between any one of a plurality of communications lines.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a communications processor system wherein a digital computer controls the transmission of digitally coded data to terminals connected to a communications line, the combination comprising:

a plurality of communications control ports connected to the output of said computer for receiving parallel digital data and for generating serial digital data, each of said control ports having different operating characteristics, modem means connected to the output of each of said control ports for converting said digital signals into tone signals, a dialer for generating a sequence of dialing signals under the control of said computer, an interfacing circuit for directing said dialing signals to a communications line, and means operable by said computer for selectively switching the outputs of any one of said modem means to said interfacing circuit, wherein said tone signals from any selected one of said modem means may be directed to the communications line in order to selectively transmit digital data having various desired characteristics over the single communications line.

2. The communications processor system of claim 1 wherein at least one of said control ports operates in an asynchronous mode and at least one of said control ports operates in a synchronous mode.

3. The communications processor system of claim 1 wherein each of said control ports operates at a different speed.

4. The communications processor system of claim 1 wherein at least one of said control ports comprises a binary synchronous device.

5. The communications processor system of claim 1 and further comprising:

termination oscillator means for being connected to ones of said modem means not connected to said dialer.

6. The communications processor system of claim 1 and further comprising:

a plurality of relays connected to the outputs of said modem means and commonly connected to the input of said interfacing circuit, address decoder means responsive to said computer for selectively energizing any one of said relays in order to connect a selected modem means to the input of said interfacing circuit.

7. In a communications processor system wherein a digital computer controls the transmission of digitally coded data to terminals connected to communications lines, the combination comprising:

a plurality of communications control ports connected to the output of said computer for receiving parallel digital data and for generating serial output data, modems connected to the output of each of said control ports for converting said serial output data into tone signals, a plurality of interfacing means for directing said tone signals to the communications lines, a dialer for generating a sequence of dialing pulses under the control of said computer, and switch means responsive to said computer for selectively switching the output of said dialer to different ones of said interfacing means such that said dialer is sequentially shared between said plurality of interfacing means.

8. The communications processor system of claim 7 wherein said switch means comprises relays having relay coils energized by said computer.

9. The communications processor system of claim 8 and further comprising:

an address decoder responsive to said computer for selectively energizing said relay coils in order to selectively switch the output of said dialer to a selected one of said interfacing means.

* * * * *